United States Patent
Zhu et al.

(10) Patent No.: US 7,769,168 B2
(45) Date of Patent: *Aug. 3, 2010

(54) LOCALLY INTERATIVE ENCRYPTION GENERATING COMPLIANT CIPHERTEXT FOR GENERAL SYNTAX SPECIFICATIONS

(75) Inventors: Bin Zhu, Edina, MN (US); Yang Yang, Jiangsu Province (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1111 days.

This patent is subject to a terminal disclaimer.

(21) Appl. No.: 11/095,048

(22) Filed: Mar. 31, 2005

(65) Prior Publication Data

US 2006/0227965 A1    Oct. 12, 2006

(51) Int. Cl.
*H04K 1/06* (2006.01)
(52) U.S. Cl. .................................. 380/37; 380/200
(58) Field of Classification Search .................. 380/37, 380/200; 713/193
See application file for complete search history.

(56) References Cited

U.S. PATENT DOCUMENTS

2002/0018565 A1* 2/2002 Luttrell et al. ............. 380/217
2003/0041258 A1* 2/2003 Wee et al. .................. 713/193
2004/0028227 A1* 2/2004 Yu ............................. 380/201
2004/0170277 A1* 9/2004 Iwamura et al. ............ 380/217

OTHER PUBLICATIONS

Compliant Encryption of JPEG2000 Codestreams by Yongdong Wu and Robert H. Deng published by IEEE 2004.*

* cited by examiner

*Primary Examiner*—Ellen Tran
(74) *Attorney, Agent, or Firm*—Lee & Hayes, PLLC

(57) ABSTRACT

A fast and secure syntax compliant encryption schema, "locally iterative encryption," can produce compliant ciphertext for a general syntax specification. In one implementation, an engine partitions a data stream into blocks, and encrypts each block iteratively until syntax compliance conditions are met. A system using the schema can utilize either stream ciphers or block ciphers in different modes. Locally iterative encryption methods are fast and remain at approximately the same speed even as the length of the data stream to be encrypted increases. Besides providing superior processing speed, the locally iterative encryption schema is also more robust to errors in the resulting ciphertext and in the resulting decrypted plaintext than conventional syntax compliant encryption techniques. Locally iterative encryption is secure as long as an underlying encryption cipher selected for use in the schema is secure.

19 Claims, 9 Drawing Sheets

US 7,769,168 B2

LOCALLY INTERATIVE ENCRYPTION GENERATING COMPLIANT CIPHERTEXT FOR GENERAL SYNTAX SPECIFICATIONS

TECHNICAL FIELD

The subject matter relates generally to computer cryptography and more specifically to locally iterative encryption generating compliant ciphertext for general syntax specifications.

BACKGROUND

Multimedia is often encrypted to prevent unauthorized consumption. Typical protection encrypts multimedia data and restricts access to the decryption key(s) to only authorized users. This approach is widely used in multimedia Digital Rights Management (DRM) which provides persistent protection for content from creation to consumption.

However, a secure encryption may create encrypted data that is not compliant with the syntax standard being applied to the unencrypted data. For example, a JPEG 2000 image is expected to conform to JPEG 2000 formatting, but when encrypted, the JPEG 2000 image may become "out-of-spec" or noncompliant with the JPEG 2000 syntax. This means that the encrypted form of the data cannot be handled in the same manner as the original, unencrypted data. A good cipher applied to multimedia data may produce "random" ciphertext that may emulate or accidentally create marker bits that the original syntax is carefully designed to avoid.

Data in a multimedia bitstream is often organized into structural groups, referred to as packets. A packet consists of header fields and data fields. Each packet starts with a unique marker to indicate the start of a packet, and may end with another unique marker. Boundaries between each field may also be indicated by delimiting markers.

Markers in a multimedia bitstream are a set of special binary strings that are defined and reserved by the multimedia format. Different formats use different markers. To facilitate easy identification of each packet and each individual field in a packet, data in each multimedia format is coded with a carefully designed coding schema to avoid emulation of any markers in the data fields. Otherwise misidentification of part of the data payload for a marker may result in the bitstream being parsed incorrectly and generating an incorrect result.

For example, in the JPEG 2000 image coding standard, certain compressed bitstreams do not allow any values in the range of hexadecimal 0xFF90 through 0xFFFF (decimal 65,424 through 65,535) for any two consecutive bytes of coded data, or the value of hexadecimal 0xFF (decimal 255) as the last byte (see, *Information Technology—JPEG 2000 Image Coding System*, Part 1: Core Coding System, ISO/IEC 15444-1:2000). JPEG 2000 also allows an optional arithmetic coding bypass in which raw bits are output to the bitstream without arithmetic coding. In this arithmetic coding bypass mode, data is not allowed to have a byte of value hexadecimal 0xFF as the last byte or to be followed by a binary 1 as the most significant bit (MSB) of the next byte.

Another example of values that are reserved for the boundary markers and other syntax functions of a multimedia format is the MPEG-4 Fine Granularity Scalability (FGS) video coding standard (see, for example, W. Li, "Overview of Fine Granularity Scalability in MPEG-4 Video Standard," *IEEE Trans. on Circuits and Systems for Video Technology*, vol. 11, no. 3, pp. 301-317, March 2001; or, "MPEG-4 Video Verification Model Version 17.0," ISO/IEC JTC1/SC291WG11 N3515, Beijing, July 2000). In the MPEG-4 FGS model, compressed bit-plane data in the enhancement layer is grouped into packets separated by a bit-plane start code denoted as "fgs_bp_start_code" or, if a flag "fgs_resync_marker_disable" is set to zero, then a resynchronization marker denoted as "fgs_resync_marker" is used. Both markers are byte-aligned, i.e., start at a byte boundary. The marker fgs_bp_start_code starts with 23 bits of 0's followed by hexadecimal 0xA (decimal 10) plus another five bits to indicate which bit-plane the data belongs to. The marker fgs_resync_marker is 22 bits of 0's followed by bit 1. Therefore compressed bit-plane data in a packet does not allow byte-aligned 22 consecutive binary zeros.

To avoid this problem of the encryption technique accidentally forming ciphertext that includes forbidden/reserved characters, a typical method adds additional information to unencrypted header fields of a packet such as length of the ciphertext or the number of occurrences of marker emulation in the data field to ensure correct decryption and decoding of encrypted multimedia content (see, C. Yuan, B. B. Zhu, M. Su, X. Wang, S. Li, and Y. Zhong, "Layered Access Control for MPEG-4 FGS Video," *IEEE Int. Conf. Image Processing*, Barcelona, Spain, vol. 1, pp. 517-520, September 2003). The resulting bitstream, however, may not be syntax compliant. This syntax noncompliant approach has several drawbacks. First, the encrypted bitstream may not be backward compatible. Adding header fields to a packet may lead a compliant but encryption-unaware decoder to parse a packet incorrectly and produce undesirable results. This type of encryption may also impair fast random access of encrypted multimedia, a very desirable feature, especially when playing long audio-visual content. The syntax noncompliant approach may also cause incorrect parsing and false synchronization when error or data loss occurs, resulting in deteriorated error resilience, and extended blackouts.

In many applications, it is very desirable that encrypted multimedia still be syntax compliant so that spurious markers do not appear in ciphertext. This is actually a goal pursued by many researchers in multimedia encryption and protection arts. For example, in developing JPSEC, a security approach to protect JPEG 2000 codestreams, i.e., Part 8, of the JPEG 2000 standard, experts in the standardization committee have tried in the past few years to develop encryption schemata that meet the strict syntax compliance requirement of JPEG 2000, but for encrypted bitstreams. In addition to multimedia encryption such as JPEG 2000 and MPEG-4 FGS encryption, syntax compliant encryption may also find applications in encrypting other structural data such as extensible markup language (XML) data, Internet packet data, etc.

In the case of JPEG 2000, several encryption schemata have been proposed recently to generate syntax compliant ciphertext for JPSEC. One schema, proposed by H. Wu and D. Ma, "Efficient and Secure Encryption Schemes for JPEG2000," *IEEE Int. Conf. on Acoustics, Speech, and Signal Processing,* 2004 (*ICASSP '04*), vol. 5, pp. V869-872, May 2004, referred to herein as a partial encryption schema, encrypts a JPEG 2000 data stream in the following manner. A keystream is first generated with a stream cipher, and any byte of value 0xFF is removed from the keystream. If a byte in the plain stream is of value 0xFF, both this byte and the following byte are copied to the ciphertext without encryption. The remaining bytes are encrypted byte by byte in a modular addition, that is, for each byte $m_i$ in the remaining plaintext and a corresponding byte $s_i$ from the keystream, the output byte to the ciphertext is $c_i=(m_i+s_i)$ mod 0xFF. This partial encryption schema leaves some portions of plaintext unencrypted. More alarmingly, locations and lengths of unencrypted substreams are publicly known. Further, this approach is syntax specific and difficult to extend to a general syntax specification.

FIG. 1 shows another conventional approach for keeping an encrypted data stream syntax compliant: globally iterative encryption 100 (see, Y. Wu and R. H. Deng, "Compliant Encryption of JPEG2000 Codestreams," *IEEE. Int. Conf. on Image Processing* 2004 (*ICIP'04*), Singapore, October 2004). Globally iterative encryption 100 works with both block and stream ciphers, and is applicable for a general syntax specification. A block cipher can be used directly with the iterative encryption schema. A stream cipher needs to be modified to work with this schema since a typical stream cipher encrypts plaintext by XORing (the bitwise exclusive-or operation) the stream with a keystream generated from a secure generator. Applying the same keystream in the second round of encryption produces the plaintext. For a stream cipher to work with the iterative encryption, a slower modular addition is used in place of the XOR operation. If the (plaintext) data to be encrypted, M 102, has n bits, and S is a keystream of the same length generated by a secure sequence generator, modular addition produces an output $C=M+S \mod 2^n$ as the ciphertext 104. Decryption of such encrypted ciphertext is $M=C-S \mod 2^n$. For a stream cipher of modular addition, if encryption is iteratively applied 106 to plaintext M 102 multiple times r, until the intermediate result of an encryption iteration meets a syntax specification 108, then the output compliant ciphertext can be expressed as $$C=M+rS \mod 2^n, \quad (1)$$

where S is the keystream.

The globally iterative encryption schema 100 has a few drawbacks. One drawback is the computational complexity. Globally iterative encryption to produce a compliant ciphertext has much higher complexity than conventional block or stream cipher encryption, especially when the plaintext is long or the probability that an illegal substream appears is high.

FIG. 2 shows some disadvantages of the conventional globally iterative encryption schema. A first graph 200 shows the number of iterations to produce a syntax compliant ciphertext versus the length of the data stream to be encrypted. The complexity of the conventional globally iterative encryption schema 100 increases exponentially with the length of ciphertext, as encryption or decryption of a portion of data in this schema is dependent on the entire data-since the ending condition for globally iterative encryption 100 (or decryption) is that the whole data is syntax compliant. This is very different from conventional stream and block cipher encryption in which encryption or decryption of a current block depends only on the current and previous data. A second graph 202 shows that the speed of the globally iterative encryption schema 100 decreases in relation to the length of the data stream to be encrypted, in fact decreases exponentially as the length of the data stream to be encrypted increases.

The global dependency inherent in a globally iterative encryption schema 100 does not allow any truncation of the entire cipherstream 104 (the entire encrypted data). If the encrypted data is not completely received at a deciphering agent, then all of the received cipertext 104 has to be discarded since decryption is useless as it may stop at a wrong iteration of decryption. This is very undesirable for encryption of scalable multimedia streams. An encrypted scalable stream should still be able to be truncated directly even in the ciphertext so that scalability functionalities offered by the scalable stream are not severally impaired after encryption (see, B. B. Zhu, M. D. Swanson, and S. Li, "Encryption and Authentication for Scalable Multimedia: Current State of the Art and Challenges," *Proc. of SPIE Internet Multimedia Management Systems V*, vol. 5601, pp. 157-170, Philadelphia Pa., October 2004). If there is a bit error 110 in the original plaintext, the global dependency may also propagate bit errors to the whole ciphertext 104. The same is also true for bit errors that occur in the ciphertext 104, that propagate to the whole decrypted plaintext. This especially occurs when an erroneous bit removes or generates an illegal substream during a decryption iteration so that the decryption stops at a wrong iteration.

Another problem with the globally iterative encryption schema 100 is that when r, i.e. the number of iterations in encryption, is not prime to $2^n$ in Equation (1), then some trailing bits are not encrypted by the globally iterative encryption schema 100. For example, if $r=2^q<2^n$, then the last q bits of plaintext are not encrypted. Since the number of unencrypted bits is a 2-based logarithm of the greatest common divisor (gcd) of r and $2^n$, the unencrypted trailing bits are typically small. This may not amount to a very great vulnerability unless the last several bits are very important.

A slightly different iterative block cipher encryption schema is proposed for syntax compliant JPEG 2000 encryption in H. Wu and D. Ma, "Efficient and Secure Encryption Schemes for JPEG2000," *IEEE Int. Conf. on Acoustics, Speech, and Signal Processing*, 2004 (*ICASSP '04*), vol. 5, pp. V869-872, May 2004. In this schema, every byte which is not of hexadecimal value 0xFF or whose preceding byte is not of value 0xFF is extracted from plaintext to form a new stream of data which is then encrypted iteratively with a block cipher until the output does not contain any byte of value 0xFF. The resulting ciphertext is then partitioned and placed back to the original positions in the plaintext to obtain the ciphertext. In addition to the drawbacks of the globally iterative encryption schema 100 described just above, this schema may extract wrong bytes and obtain a misaligned cipherstream to be decrypted when error occurs in the ciphertext, and results in the whole decrypted data being garbled.

Yet another syntax compliant encryption schema called ciphertext switching encryption which works with a stream ciphers such as RC4 and SEAL has been proposed by B. B. Zhu, Y. Yang, and S. Li, in "Ciphertext Switching for Syntax Compliant Encryption," submitted to *IEEE Trans. on Image Processing*. In ciphertext switching encryption, post-processing is used to make the output of a conventional stream cipher encryption syntax compliant. More specifically, illegal substreams in the output of conventional stream cipher encryption are switched back to the original substreams in the plaintext to obtain syntax compliant ciphertext. This "switching" occurs rarely. For example for arithmetic coded data in JPEG 2000, only about 0.34% data are switched to plaintext, and each occurrence is about 2 bytes long on average. Unlike the partial encryption schema mentioned above, in which unencrypted data is publicly known, the location of switched data in the ciphertext switching encryption schema depends on both the plaintext and the random and unpredictable keystream, and therefore is itself random and unpredictable too. This ensures the security of the ciphertext switching encryption schema. One drawback of the schema is that it cannot be extended to work with block ciphers. A disadvantage of using a stream cipher for encryption is that there is a one-to-one correspondence between the ciphertext and the plaintext. It is possible to modify some bits in the ciphertext and observe the consequence after decryption to gain a knowledge of the structures of the original data. Thus, many applications prefer to use more widely-known block ciphers instead of stream ciphers.

What is needed is an encryption technique that can produce syntax compliant ciphertext, yet avoid the many problems and disadvantages discussed above.

SUMMARY

A fast and secure syntax compliant encryption schema, "locally iterative encryption," can produce compliant ciphertext for a general syntax specification. In one implementation, an engine partitions a data stream into blocks, and encrypts each block iteratively until syntax compliance conditions are met. A system using the schema can utilize either stream ciphers or block ciphers in different modes. Locally iterative encryption methods are fast and remain at approximately the same speed even as the length of the data stream to be encrypted increases. Besides providing superior processing speed, the locally iterative encryption schema is also more robust to errors in the resulting ciphertext than conventional techniques of syntax compliant encryption. Locally iterative encryption is secure as long as an underlying encryption cipher selected for use in the schema is secure.

DETAILED DESCRIPTION

Overview

Systems, engines, methods, and schemata are described herein for exemplary "locally iterative encryption." Locally iterative encryption (also referred to herein as "LIE") is a fast, efficient, secure, syntax compliant encryption schema that produces compliant ciphertext (encrypted data) for particular or general syntax specifications.

In this description, various terms, such as "plaintext," "plainstream," "unencrypted data," etc., are used somewhat interchangeably for the data stream to be encrypted 102. Likewise, various terms, such as "ciphertext," "cipherstream," "encrypted data," etc., are used somewhat interchangeably for encrypted data streams (e.g., 104, 306).

Figure 1:
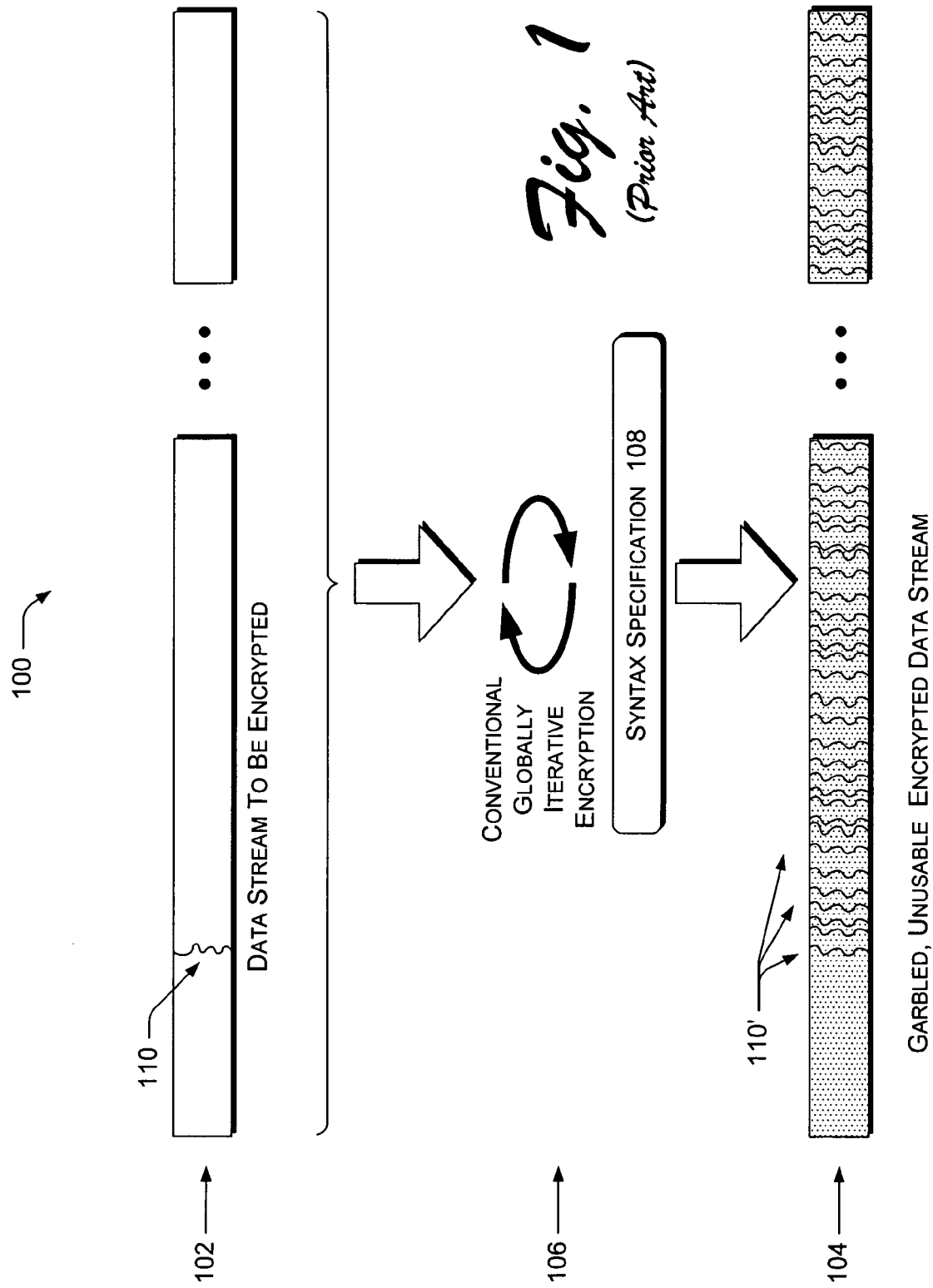
FIG. 1 is a graphic representation of a conventional globally iterative encryption technique.
Figure 2:
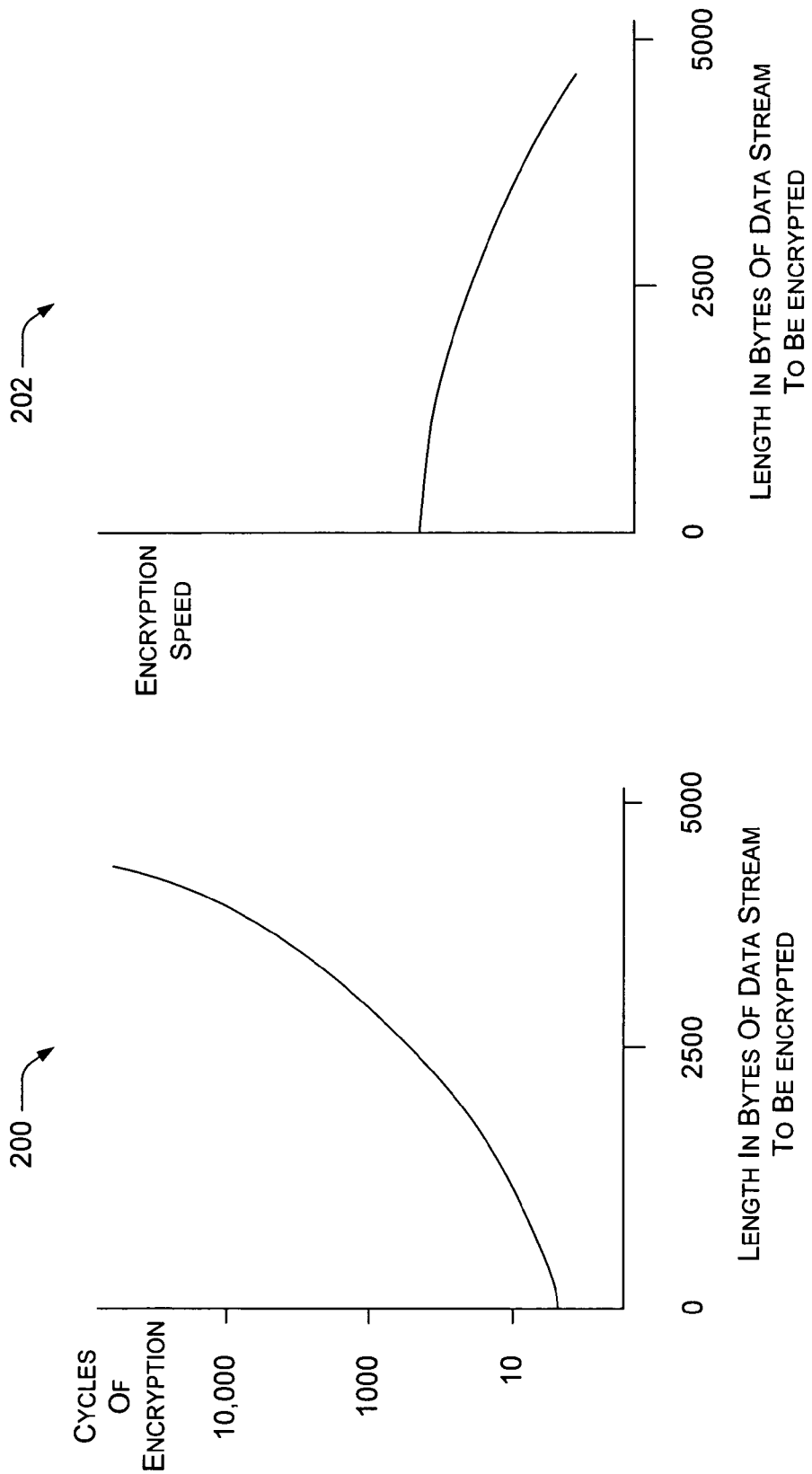
FIG. 2 is a graphic representation of speed and complexity of conventional globally iterative techniques.
Figure 3:
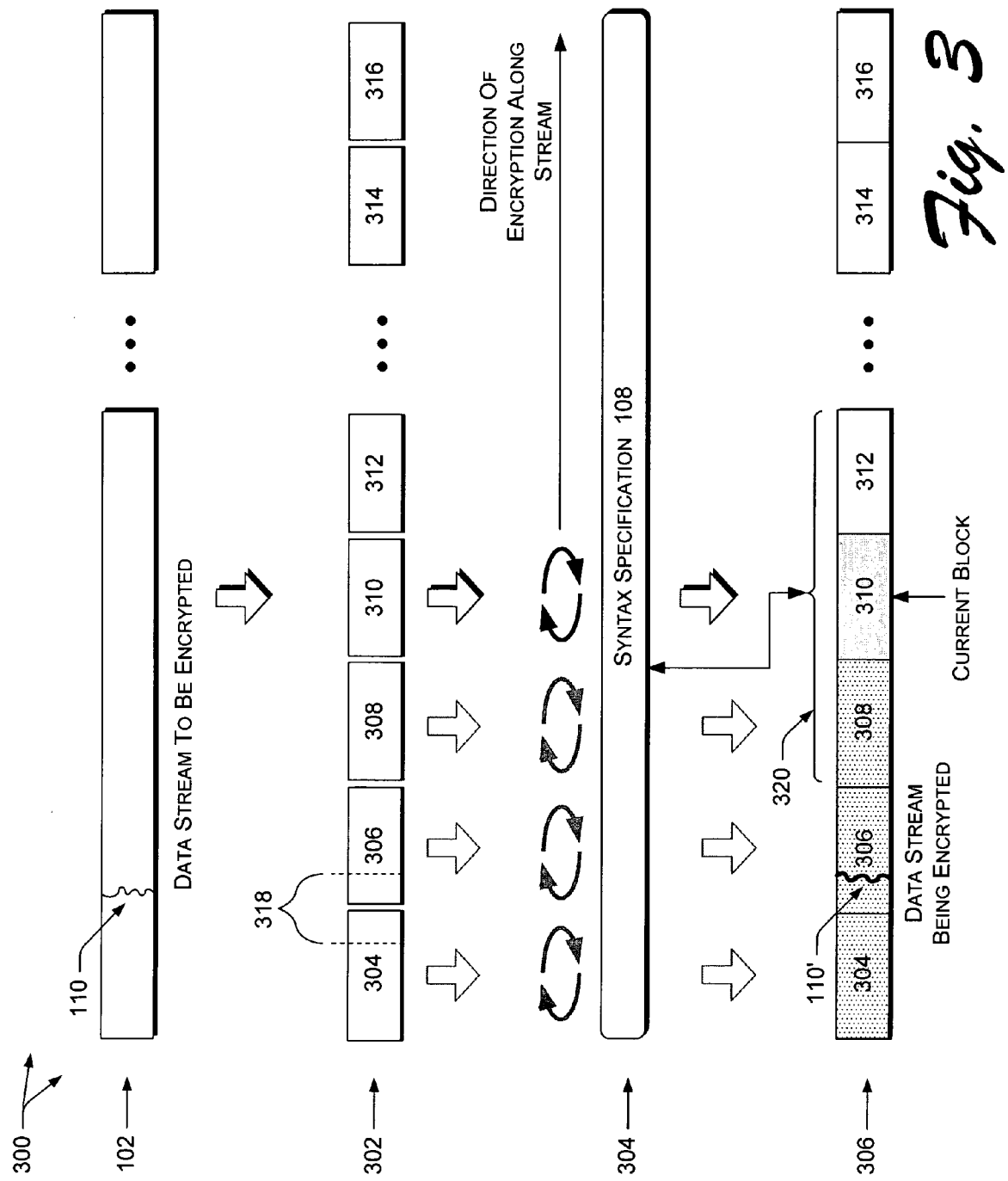
FIG. 3 is a graphic representation of exemplary locally iterative encryption.

As shown in FIG. 3, a LIE schema begins with data to be encrypted 102 and partitions 302 the data to be encrypted 102 into disjoint "physical" data blocks (e.g., 304, 306, 308, 310, 312, ..., 314, 316). Each individual data block (e.g., 310) is locally (individually) encrypted via one or more encryption cycles. While these data blocks are being described, it should be noted that the LIE schema can process the data blocks using either stream ciphers or block ciphers in different modes.

The number of encryption cycles to use for each individual block 310 depends in part on whether the resulting ciphertext from a given encryption cycle is syntax compliant. Just as importantly, the bytes at adjacent ends of two adjacent data blocks (e.g., 304, 306) form a spanning sequence (e.g., 318) of bytes that is syntax compliant across block boundaries when the correct number of locally iterative encryption cycles have been performed for each of the adjacent blocks. Further, the "in process" transitional states of adjacent blocks—i.e., when the previous block (e.g., 308) has already been encrypted, the current block (e.g., 310) is being encrypted, and the subsequent block (e.g., 312) has not yet been encrypted—also dictate in part how many encryption cycles each block should undergo. That is, each block undergoes a number of encryption cycles, such that during decryption, a syntax test is able to overcome the accidental random appearance of reserved marker bits and reserved bit sequences in a block 310 and its surrounding blocks.

In order to accomplish a syntax test that overcomes the accidental random production of reserved bits and sequences during decryption, the exemplary schema of FIG. 3 also partitions the data into "logical" or theoretical blocks (e.g., 320) that overlap each other and/or encompass multiple physical blocks (e.g., 308, 310, 312). Since an effective syntax test aims to resolve reserved symbols that crop up accidentally during decryption, a logical block 320 can encompass one or more previous blocks 308 from the cipherstream 306 that have already been encrypted, a current block 310 that is being encrypted, and a next block 312 from the original data stream to be encrypted 102 that is still in original plaintext. In practice, a buffer holds these various kinds of blocks, some in ciphertext and some in plaintext, as the locally iterative encryption process (or decryption process) proceeds from one end of a data stream to the other.

In some implementations, the logical or theoretical blocks are not explicitly stored anywhere. Instead, the logical blocks are only derived theoretically by reading ahead or reading backwards from a current block into adjacent blocks. Thus, by delving a certain depth into an adjacent block, the LIE schema determines if bytes at or near the boundary of the adjacent block render bytes at or near the boundary of the current block "syntax noncompliant." For example, if a sequence of two particular bytes is forbidden (or reserved) by a given syntax specification 108, and by chance the sequence occurs across a boundary after a round of encryption because the end bytes of two adjacent encrypted blocks each have one of the bytes, then at least one of the encrypted blocks will be subjected to the process of another iteration of encryption in order to ensure that the forbidden sequence is eliminated. In other words, the size of the logical or theoretical blocks for syntax testing is selected to provide enough overlap of adjacent blocks to test for syntax compliance across these blocks.

Thus, in the illustrated LIE schema, each block 310 is iteratively encrypted 304 a number of times suitable for that block—i.e., until certain conditions are met. As already mentioned, the conditions to be met include compliance with the syntax specification 108, not only for the current block 310 taken in isolation, but especially for each block 310 when considered in the context of its adjacent and neighboring blocks.

Figure 4:
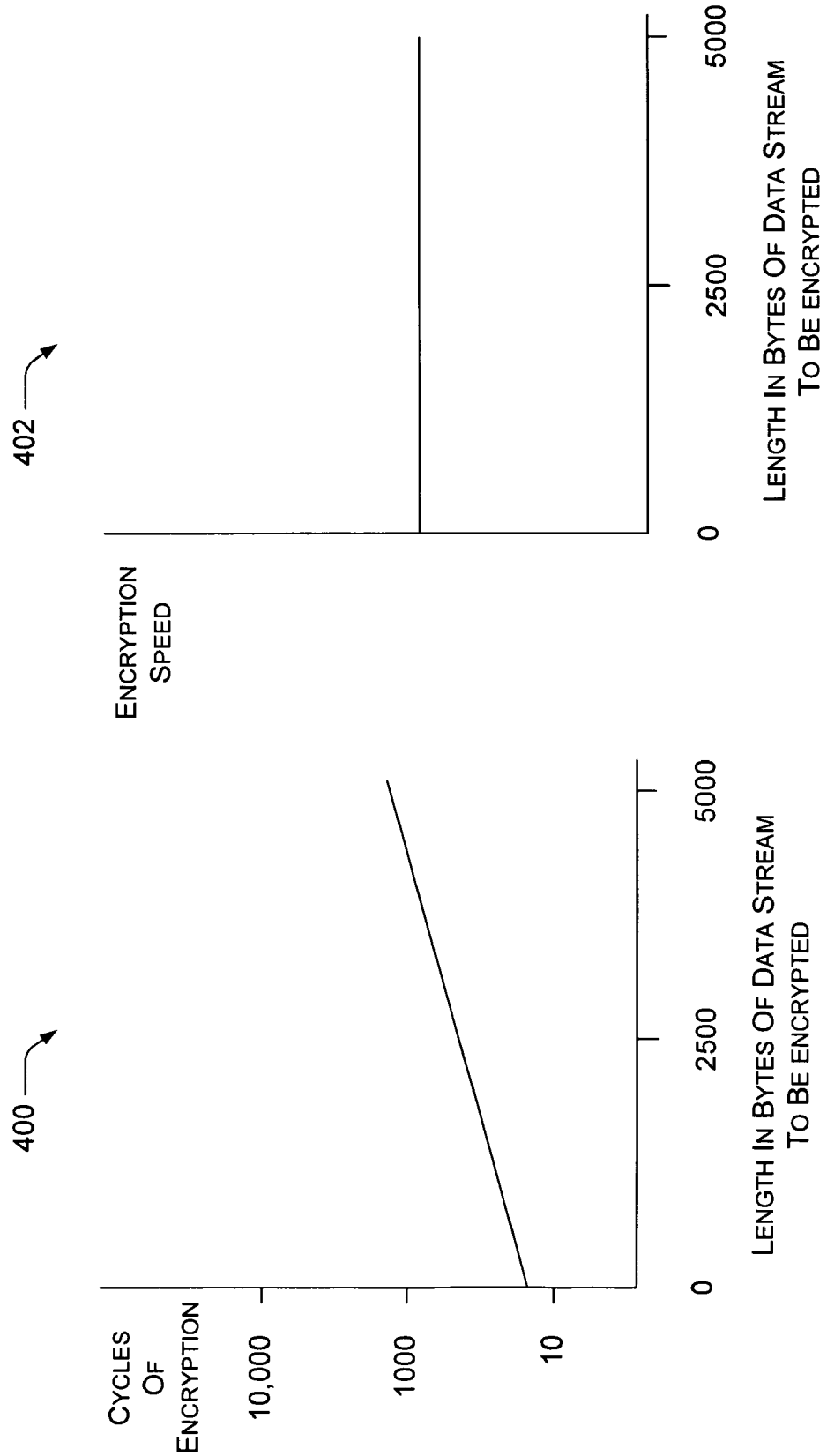
FIG. 4 is a graphic representation of speed and complexity of an exemplary locally iterative encryption method.

FIG. 4 shows some advantages of the locally iterative encryption schema 300. A first graph 400 shows the overall number of block encryption iterations that occur when producing a syntax compliant ciphertext versus the length of the data stream to be encrypted. The relationship is linear, implying the number of iterations used to encrypt an individual block remains the same across the stream on average, the iterations for subsequent blocks being cumulatively to the overall number of iterations for previous blocks. A second graph 402 shows that the locally iterative encryption schema 300 has superior processing speed. Unlike the conventional globally iterative encryption schema 100 with a processing speed that drops dramatically as the size of plaintext to be encrypted increases, the processing speed of the locally iterative encryption schema 300 remains about the same as the length of plaintext increases.

Returning to FIG. 3, the locally iterative encryption schema 300 is also more robust to errors in the resulting ciphertext 306 than conventional globally iterated ciphertext 104. A bit error 110 in the data stream to be encrypted 102 does not become propagated throughout the entire ciphertext 306, but instead, at worst, the data error 110' is contained to its corresponding block (e.g., block 306) and possibly neighboring blocks (e.g., block 308). The same is also true for error propagation during decryption process for both LIE 300 and the conventional globally iterative encryption 100. The LIE schema 300 is secure as long as the underlying encryption cipher selected for the encryption is secure.

Exemplary LIE Environment

Figure 5:
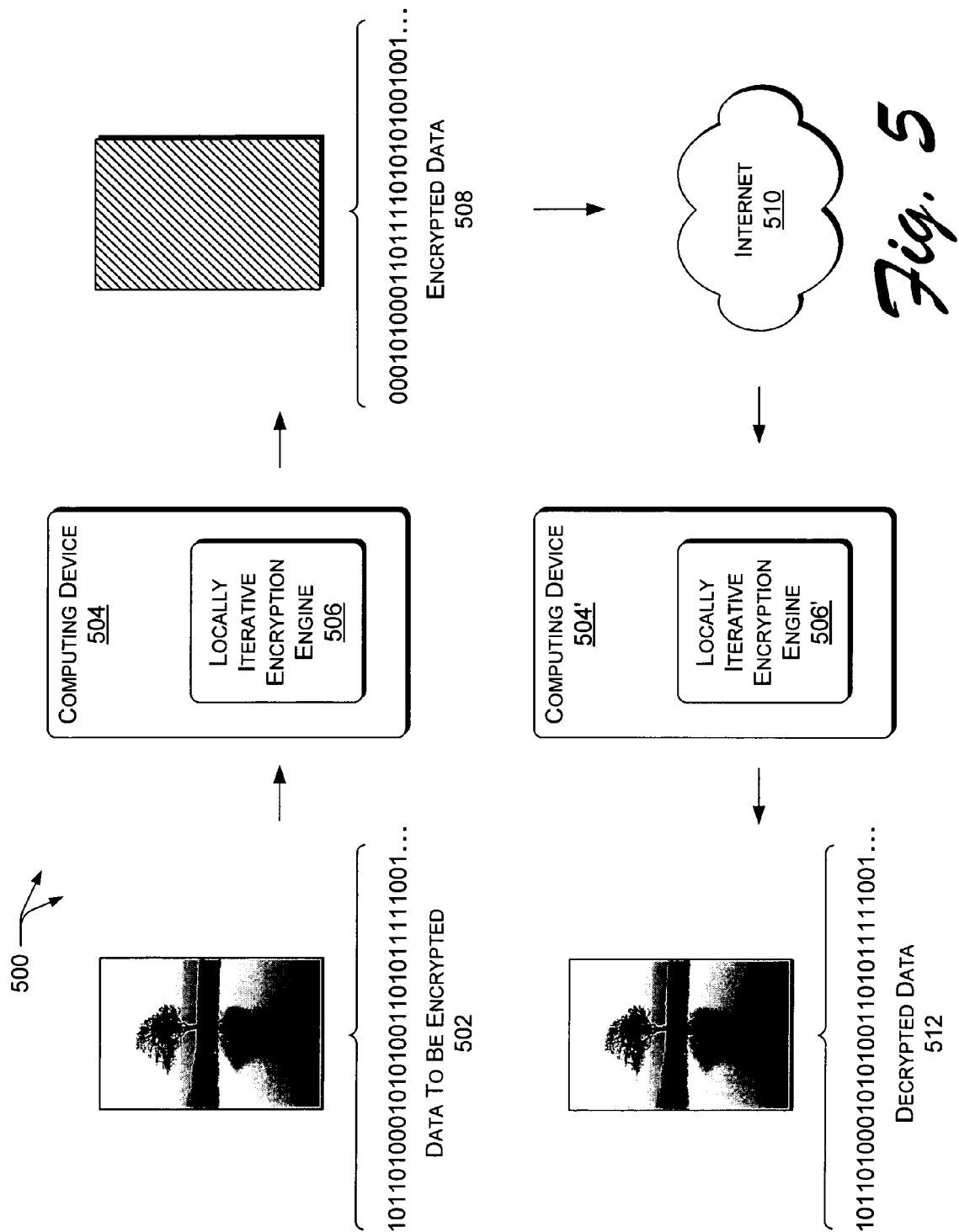
FIG. 5 is a graphic representation of an exemplary environment for locally iterative encryption.

FIG. 5 shows an exemplary environment 500 in which the subject matter may be practiced. Data to be encrypted 502 is received by a computing device 504 that includes an implementation of the subject matter, such as an exemplary locally iterative encryption & decryption engine, referred to hereafter as a "LIE engine" 506. The LIE engine 506 secures the data using one or more features of LIE encryption. The encrypted data 508 is distributed, typically over the Internet 510, to a recipient with a computing device 504' that has another instance of the exemplary LIE engine 506', or other decryption components according to the subject matter. Exemplary decryption techniques, to be described below, are applied to the encrypted data 508, rendering decrypted data 512.

Exemplary LIE Engine

Figure 6:
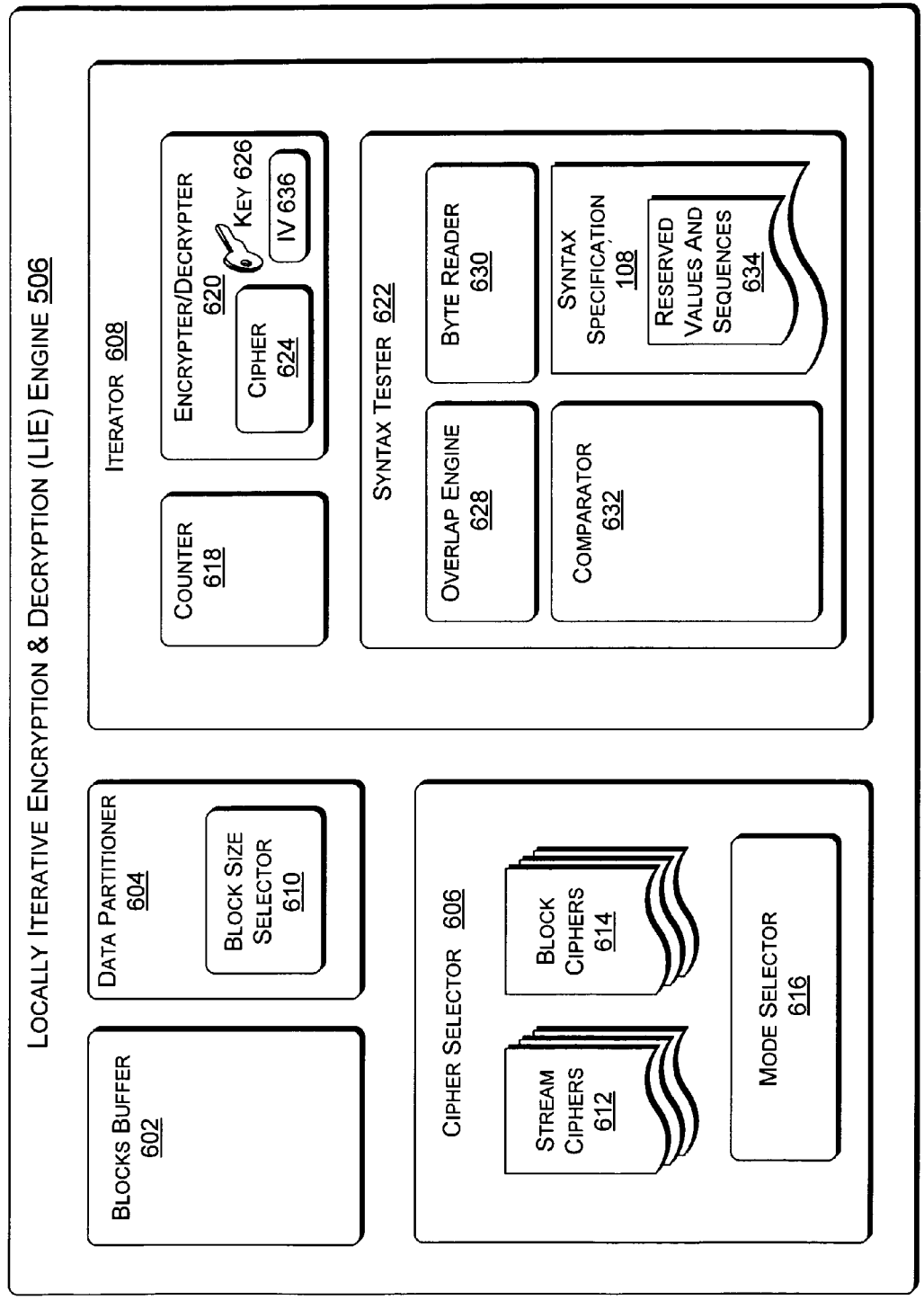
FIG. 6 is a block diagram of an exemplary locally iterative encryption and decryption engine.

FIG. 6 shows the exemplary LIE engine 506 of FIG. 5 in greater detail. The LIE engine 506 illustrated in FIG. 6 is meant to provide one example arrangement for the sake of overview. Many other arrangements of the illustrated components, or similar components, are possible. It is worth noting that an exemplary LIE engine 506 can be executed in hardware, software, or combinations of hardware, software, firmware, etc.

In one implementation, a LIE engine 506 includes a blocks buffer 602, a data partitioner 604, a cipher selector 606, and an iterator 608. The data partitioner 604 further includes a block size selector 610 to determine the size of data blocks to be iteratively encrypted and if needed to determine the size of logical or theoretical blocks for syntax testing. Again, the logical blocks are used to determine how many iterations are sufficient for each block in order to ensure syntax compliance for that block in the context of its neighboring blocks.

The cipher selector 606 selects either one of multiple stream ciphers 612 or one of multiple block ciphers 614 available to the LIE engine 506. Some implementations of a LIE engine 506 may have only one built-in cipher. The cipher selector 606 may also include a mode selector 616 to choose between different modes available for a selected cipher 614.

The iterator 608 includes a counter 618, an encrypter/decrypter ("encrypter") 620, and a syntax tester 622. The encrypter 620 includes a cipher 624, such as one of the ciphers 624 selected by the cipher selector 606, and typically a secret key 626 and possibly initialization vector (IV) 636. The syntax tester 622 further includes an overlap engine 628, a byte reader 630, a syntax specification 108, and a comparator 632. The syntax specification 108 includes a database of reserved values and sequences 634 to be compared by the comparator 632 with bytes and bytes sequences read by the byte reader 630.

The criterion for determining the number of encryption iterations to perform on a given block is that after the "nth" iteration the ciphertext of the block no longer generates "illegal symbols" (the reserved values 634) when appended with ciphertexts of the previous block(s) and followed by plaintexts of the subsequent block(s). When this condition is globally true, then the entire ciphertext is syntax compliant, including byte spans that bridge across block boundaries. Thus, dependency between two adjacent blocks is also considered, because this may make decryption of a subsequent block stop at a wrong iteration. The LIE engine 506 iterates each block a certain number of times for that block, such that the logically overlapping parts of blocks are also syntax compliant and each block is able to be correctly decrypted.

JPEG 2000 Compressed Data Implementation

An implementation of the LIE engine 506 for JPEG 2000 Compressed Data Encryption will be presented first, followed by an implementation for general syntax.

The JPEG 2000 syntax does not allow compliant text to possess two consecutive bytes of values in the range from hexadecimal 0xFF90 to 0xFFFF or to possess blocks with a last byte of hexadecimal value 0xFF. In the following example implementation, the LIE engine 506 uses a block cipher in Electronic Codebook (ECB) mode.

Some notations are now introduced to aid the description. Let the plaintext data to be encrypted 102 be designated by M, and let the resulting ciphertext 306 be C. A conventional encryption cipher 624 (i.e., an encryption function) designated as E operates on plaintext M 102 with a key K 626 and produces C: $C=E_K(M)$. A corresponding decryption operation, to be discussed below, will be denoted by $M=D_K(C)$. The iterator 608 applies a round of encryption via the block encrypter 620 j times, as recorded by the counter 618. That is, the iterator 608 applies a round of encryption to the current block, which is already in encrypted form (except for the very first round of encryption), as denoted by $E_K^j(M)=E_K(E_K^{j-1}(M))$, where $E_K^0(M)$ is defined as M, i.e., $E_K^0(M)=M$. The following identities hold true for each encryption scenario: $M=D_K(E_K(M))$ and $C=E_K(D_K(C))$. The subscript K representing the key 626 may be omitted if it is clear from the context.

In the example being described here, the data partitioner 604 divides plaintext 102 of length L bytes (with appropriate appending if necessary) into N disjoint "physical" blocks $m_i$ (e.g., 304, 306, 308, 310, 312, ..., 314, 316) of block size $L_i$ bytes, where $L_i$ is a multiple of encryption block size $L_{EB}$, $0 \leq i < N$ if a block cipher is selected by cipher selector 606. In this case, a typical choice for the size $L_i$ of each block $m_i$ is $L_i = L_{EB}$, that is, each block is of the same size as the encryption block size of the block cipher 624 used by the encrypter 620. If a stream cipher 624 is selected for use by cipher selector 606, the size $L_i$ of each block $m_i$ is typically chosen to be the size of a word of the underlying computing device, i.e., a word size that addition and subtraction are directly supported by on the device. The k-th byte in a block $m_i$ is denoted by $m_i(k)$. Let "∘" denote an appending operation, and $M_i$ denote the data consisting of all the blocks with indexes smaller than or equal to i: $M_i = m_0 \circ m_1 \circ \ldots \circ m_i$, $0 \leq i < N$. One observation is that $M \equiv M_{N-1}$. The corresponding notation for ciphertext 306 is $c_i = E_K^{I_i}(m_i)$ and $C_i = c_0 \circ c_1 \circ \ldots \circ c_i$, where $I_i$ is the number of encryption iterations applied to i-th block $m_i$. We define $M_{-1}=m_{-1}=C_{-1}=c_{-1}=\phi$.

As mentioned above, applying iterative encryption independently to each block cannot produce a syntax compliant stream of ciphertext 306 since a sequence of bytes that spans between the ends of two adjacent blocks may or may not be syntax compliant. This syntax noncompliance of single blocks could be resolved if the syntax tester 622 prompted enough encryption iterations of current block $m_i$ to ensure that the resulting ciphertext of block $m_i$ when combined (appended) with the ciphertext of the previous block, i.e., $c_{i-1} \circ c_i$, is compliant with the syntax specification 108, specifically with the reserved values sequences 634. This criterion for how many iterative encryption cycles to apply to a single block seems to generate syntax compliant ciphertext but in actuality, some blocks may not be recoverable back into plaintext from the ciphertext.

To understand why some blocks would not be recoverable from the ciphertext if only the interaction between a current block and a previous block were considered, the iterative decryption of the current block c; is now examined. In generating that value of $c_i$, the encryption function $E_K$ is iteratively applied to $m_i$ until $c_{i-1} \circ c_i$ is syntax compliant. To reverse the encryption operations, $c_i$ should be iteratively decrypted until the resulting decrypted block $m'_i$ and its combination with the ciphertext of the previous block, $c_{i-1} \circ m'_i$, are both syntax compliant. Unfortunately, the spanning sequence of bytes between $c_{i-1}$ and $m_i$, i.e., $c_{i-1} \circ m_i$, does not provide a good test of syntax compliance—that is, there is no requirement that the intermediate state consisting of the plaintext of the current block and the as yet still encrypted ciphertext of the previous block have a sequence of spanning bytes between them that are properly testable for syntax compliance.

When the intermediate state described above does occurs, the iterative decryption of the current block $c_i$ may not stop at the correct number of iterative decryption cycles, resulting in garbled decrypted block $m_i$. For example, if the last byte of $c_{i-1}$ is of value 0xFF, and the first byte of $m_i$ is of value 0xAF, then decryption of $c_i$ will not stop at the correct decryption cycle when the 0xAF value is recovered because its combination with the last byte of the previous block's ciphertext is of value 0xFFAF which is not allowed—the iterative decryption gets prematurely terminated.

In one implementation, the problem just described can be avoided by having the overlap engine 628 consider the interaction between additional blocks—these blocks are held for processing by the blocks buffer 602—when deciding how many encryption cycles to apply to a current block $m_i$. Thus, the above problem can be resolved by having the syntax tester 622 ensure that the current block $m_i$ is encrypted such that $c_{i-1} \circ c_i \circ m_{i+1}$ is syntax compliant. That is, iterator 608 applies iterative encryption cycles to current block $m_i$ until the combination consisting of the encrypted current block, the encrypted previous block, and the plaintext of the subsequent block (to be encrypted next) are all syntax compliant when examined as a theoretical block.

Given the notations set forth above, the exemplary locally iterative encryption for "JPEG 2000 compression data syntax compliant encryption" performed by a LIE engine 506 can be described in pseudo C++ code as follows:

```
C = M;          // copy plaintext to ciphertext
if (N == 1) {   // single block
    do {
        c₀=E_K(c₀);         // iteratively encrypt the block
    } while (∃ consecutive two bytes in c₀ >=0xFF90 or last byte
             of c₀ ==0xFF);
```

```
} else {        // multiple blocks
    for (i=0; i<N; ++i) {
        if (i == 0) {       // first block
            do {
                c_i=E_K(c_i);
            } while (∃ consecutive two bytes in c_i >=0xFF90 or
                     (c_i(L_i-1)==0xFF && m_{i+1}(0) >=0x90));
        } else if (i == N - 1) { // last block
            do {
                c_i=E_K(c_i);
            } while (∃ consecutive two bytes in c_i >=0xFF90 or
                     last byte of c_i ==0xFF or
                     (c_{i-1}(L_{i-1}-1)==0xFF && c_i(0) >=0x90));
        } else { // internal block
            do {
                c_i=E_K(c_i);
            } while (∃ consecutive two bytes in c_i >=0xFF90 or
                     (c_{i-1}(L_{i-1}-1)==0xFF && c_i(0) >=0x90) or
                     (c_i(L_i-1)==0xFF && m_{i+1}(0) >=0x90));
        }
    }
}
```

Exemplary LIE Backwards Decryption

Figure 7:
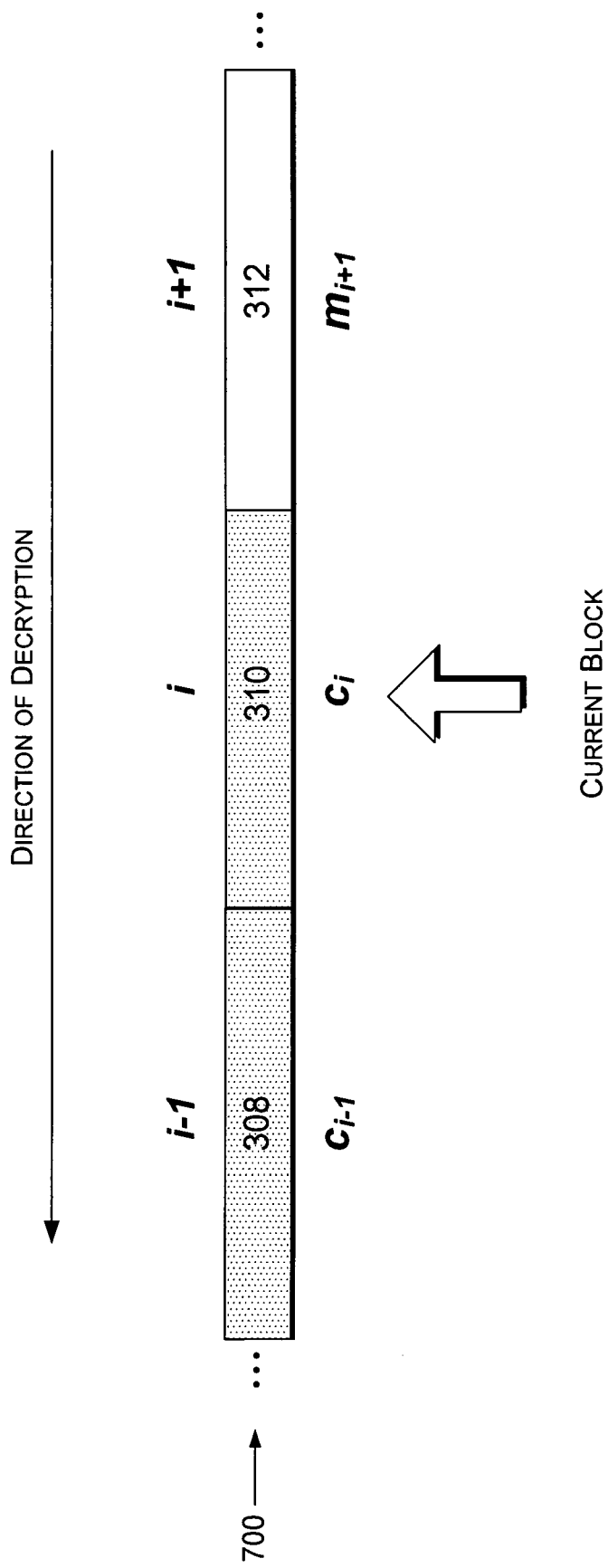
FIG. 7 is a graphic representation of exemplary backwards locally iterative decryption.

FIG. 7 shows a stream of data blocks 700 undergoing exemplary LIE backwards decryption, for example, according to the syntax specification 108 of the JPEG 2000 standard.

Recall from the description above that during encryption of the current block $c_i$ 310, the syntax tester 622 also considers ciphertext of the previous block $c_{i-1}$ 308 and plaintext of the next block $m_{i+1}$ 312 in determining how many iterative encryption cycles the current block 310 should undergo. The fact that some of the blocks considered are encrypted and some are not, and the fact that they are in a relative placement with respect to one another, has a bearing on whether forward or backward decryption is easier. During decryption in either direction, the ciphertext of the previous block $c_{i-1}$ 308 and ciphertext of the current block 310 are already available since the starting material for the decryption is ciphertext. But in a forward decryption direction, the plaintext of the next block $m_{i+1}$ 312 is not yet available when processing the current block 310, since the next block 312 has not yet been iteratively decrypted. Thus, in one implementation, the LIE engine 506 decrypts cipherstreams in a reverse direction in order to obtain the plaintext of the next block 312 before decrypting the current block 310. In other words, the most straightforward LIE decryption schema is backwards decryption, in which the last block of the cipherstream is decrypted first. Next, the second-to-the-last block is decrypted, with the plaintext of each newly decrypted block used in the decryption of the next previous block in the stream sequence until the first block is decrypted. The components and/or actions of a LIE engine 506 that implement this type of exemplary backward decryption can be summarized in pseudo C++ code as follows:

```
M = C;          // copy ciphertext to plaintext
if (N == 1) {   // single block
    do {
        m₀=D_K(m₀);           // iteratively decrypt the block
    } while (∃ consecutive two bytes in m₀ >=0xFF90 or last
             byte of m₀ ==0xFF);
} else {        // multiple blocks
    for (i=N-1; i>=0; --i) {
        if (i == 0) { // first block
            do {
                m_i=D_K(m_i);
```

-continued

```
      } while (∃ consecutive two bytes in m_i >=0xFF90 or
              (m_i(L_i-1)==0xFF && m_{i+1}(0) >=0x90));
  } else if (i == N - 1) { // last block
      do {
          m_i=D_K(m_i);
      } while (∃ consecutive two bytes in m_i >=0xFF90 or
              last byte of m_i ==0xFF or
              (m_{i-1}(L_{i-1}-1)==0xFF && m_i(0) >=0x90));
  } else { // internal block
      do {
          m_i=D_K(m_i);
      } while (∃ consecutive two bytes in m_i >=0xFF90 or
              (m_{i-1}(L_{i-1}-1)==0xFF && m_i(0) >=0x90) or
              (m_i(L_i-1)==0xFF && m_{i+1}(0) >=0x90));
  }
 }
}
```

It should be noted that when decrypting the current i-th block 310 in the above schema, the LIE engine 506 exploits the fact that $c_{i-1}$ 308 contains the ciphertext of the previous (i−1)th block, and $m_{i+1}$ contains the decrypted plaintext of the next block.

Exemplary decryption in the reverse order, however, has several potential drawbacks. One drawback is that the blocks buffer 602 should be large enough to at least store all the data of the ciphertext 306 to be decrypted. Another potential drawback is that the iterative decryption cannot begin until the last byte of the entire ciphertext 306 is received, possibly resulting in a long delay for decryption output. Yet another drawback is that if there is any loss of data, the entire segment of the ciphertext 306 that precedes the point of loss cannot be decrypted with this backwards decryption schema, and therefore has to be dropped—the data is lost.

Exemplary LIE Forward Decryption

Figure 8:
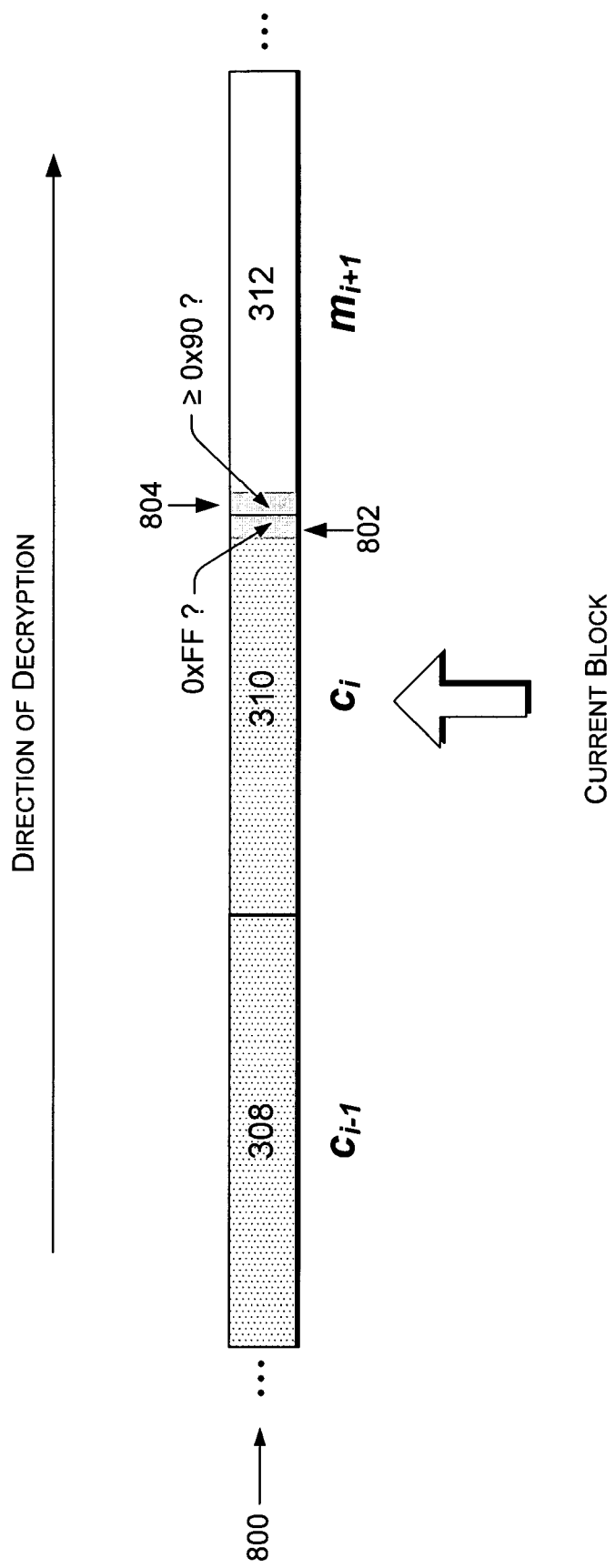
FIG. 8 is a graphic representation of exemplary forwards locally iterative decryption.

FIG. 8 shows another implementation, in which the LIE engine 506 performs iterative decryption in a forward manner, a direction similar to conventional decryption schemata. A stream of data blocks 800 undergoes exemplary LIE forward decryption. But exemplary forward decryption is often more complex than the backwards decryption schema just described above.

When decrypting the current block $c_i$ 310 in a forward decryption schema, plaintext of the next block $m_{i+1}$ 312 is not yet available. So the LIE engine 506 considers the different possibilities of how the block $m_{i+1}$ 312 would affect the number of decryption iterations needed for the current block $c_i$ 310. The only circumstance in which the plaintext of block $m_{i+1}$ 312 would affect the encryption of current block $c_i$ 310 would be if the last byte 802 of an otherwise compliant output at a certain iteration of decryption of the current block 310 was hexadecimal value 0xFF. In that case, if the value of the first byte 804 of block $m_{i+1}$ 312 was larger than or equal to 0x90, then the iterative decryption of the current block 310 would not stop. Therefore, if the output of iterative decryption of the current block 310, when combined with the ciphertext of the previous block 308, is syntax compliant and its last byte 802 is not 0xFF, then the output is the correctly decrypted plaintext of the current block 310, i.e., the decryption iterations can stop. However, if the last byte 802 of the current block 310 is value 0xFF, then the iterator 608 has to wait until the next block 312 is decrypted before it can determine whether iterative decryption of the current block 310 should stop. The current block 310 is held in the blocks buffer 602 waiting for additional decryption iterations should the condition not be met. Thus, the JPEG 2000 compliant forward decryption schema can be summarized as follows:

```
M = C;          // copy ciphertext to plaintext
if (N == 1) { // single block
    do {
        m_0=D_K(m_0);                  // iteratively decrypt the block
    } while (∃ consecutive two bytes in m_0 >=0xFF90 or last byte
             of m_0 ==0xFF);
} else {      // multiple blocks
    lastOutBlock = -1; // indicating no block's output is held
    for (i=0; i<N; ++i) {
        if (i == 0) {   // first block
            do {
                m_i=D_K(m_i);
            } while (∃ consecutive two bytes in m_i >=0xFF90);
            if (last byte of m_i==0xFF) { // hold output of the current block
                lastHoldBlock = i;
            } else {
                Output m_i as the decrypted plaintext of the i-th block
            }
        } else {
            if (i == N - 1) {   // last block
                do {
                    m_i=D_K(m_i);
                } while (∃ consecutive two bytes in m_i >=0xFF90 or
                         last byte of m_i ==0xFF or
                         (c_{i-1}(L_{i-1}-1)==0xFF && m_i(0) >=0x90));
            } else {   // internal block
                do {
                    m_i=D_K(m_i);
                } while (∃ consecutive two bytes in m_i >=0xFF90 or
                         (c_{i-1}(L_{i-1}-1)==0xFF && m_i(0) >=0x90));
                if (last byte of m_i != 0xFF) {
                    if (lastHoldBlock > = 0) {
                        for (j=i-1; j >= lastHoldBlock; --j) {
                            if (m_j(L_j-1)==0xFF && m_{j+1}(0) >=0x90) {
                                do {
                                    m_j=D_K(m_j);
                                } while (∃ consecutive two bytes in
                                         m_j >=0xFF90 or
                                         (c_{j-1}(L_{j-1}-1)==0xFF && m_j(0) >=0x90) or
                                         (m_j(L_j-1)==0xFF && m_{j+1}(0) >=0x90));
                            }
                        }
                    }
                    lastHoldBlock = -1;
                    Output blocks up to and including the current block
                } else { // hold output of the current block
                    if (lastHoldBlock <0) {
                        lastHoldBlock = i;
                    }
                }
            }
        }
    }
}
```

The probability that the last byte 802 of current block 310 is 0xFF when iterative decryption of the current block 310 is put on hold depends on the nature of the block. If the current block 310 is actually still an encrypted block (not yet decrypted enough times to get back to the original plaintext), then the probability is 1 out of 256 that the last byte 802 is 0xFF since a good cipher produces uniform distribution of all of the 256 possible values that a byte can have. If the decrypted block 310 is actually now back to the plaintext, then the probability that the last byte 802 is 0xFF depends on the distribution of the plaintext in the block 310. In general, such probability that the last byte 802 is 0xFF is very small. Therefore in most cases, the current block 310 is output as decrypted plaintext without holding when iterative decryption of the block 310 stops in the forward decryption. In other words, for most practical purposes, the output is the same as for conventional decryption techniques. Even when a block 310 is held, pending decryption of the next block 312, the number of blocks to be held for output is typically only one since the probability of having to hold two blocks that each have 0xFF as their last byte 802 is roughly the square of the probability to hold one block. If both blocks to be held are still encrypted blocks, then the probability is 1 out of $256^2$=65536.

In the event of a loss of data, all the held blocks awaiting determination of whether they need further iterative decryption cycles have to be dropped. But since the number of held blocks is almost always overwhelmingly zero, the performance of the LIE engine 506 implementing a forward LIE decryption schema is very likely to have the same level of performance as convention decryption with respect to decryption delay and lost blocks due to data loss.

Locally Iterative Encryption with Stream Ciphers

The description above covers locally iterative encryption for the "JPEG 2000 compressed data syntax" for a block cipher in electronic codebook (ECB) mode. A block cipher can also operate in other modes, or a stream cipher is used for JPEG 2000 "JPEG 2000 compressed data syntax". A LIE engine 506 can also perform LIE compliant encryption and decryption for general syntax specifications. Accordingly, an exemplary LIE general syntax compliant encryption and decryption with stream ciphers 612 such as RC4 or SEAL is described next.

To use a stream cipher 612 in a LIE schema, the block encrypter 620 uses modular addition in place of the exclusive-or (XOR) operation of conventional stream cipher encryption. For plaintext M of length L bytes, modular addition based encryption is denoted by $C=E_K(M) \equiv M+S \bmod 256^L$, where S is a keystream of length L bytes generated by the (stream) cipher 624. The corresponding decryption operation is $M=D_K(C) \equiv C-S \bmod 256^L$. These two operations will be used in the following description of LIE using a stream cipher 612.

The data partitioner 604 divides a key stream S 626 generated by a selected stream cipher 624 into blocks in the same manner (and described by the same notation) as plaintext and ciphertext blocks in FIG. 3. The block size selector 610 can make each block $m_i$ a length of $L_i$ bytes. Then, the operation of a LIE engine 506 implementing locally iterative encryption for general syntax can be summarized as follows:

```
C = M;   // copy plaintext to ciphertext
for (i=0; i<N; ++i) {
    do {
        c_i = E_K(c_i) ;
    } while (C is not syntax compliant);
}
```

In the above description the equation $E_K(c_i)=c_i+s_i \bmod 256^{L_i}$ is used for stream cipher encryption. The corresponding backward decryption scheme is:

```
M = C;   // copy ciphertext to plaintext
for (i=N-1; i>=0; --i) {
    do {
        m_i = D_K(m_i);
    } while (M is not syntax compliant);
}
```

For stream cipher encryption, $D_K(m_i)=m_i-s_i \bmod 256^{L_i}$ holds true in the above description of backward decryption. If the length $L_i$ of each block $m_i$ is long enough such that it is impossible for a substream from any consecutive three blocks (e.g., 308, 310, 312) to form an illegal symbol, then the following forward exemplary decryption schema can be used:

```
M = C;   // copy ciphertext to plaintext
lastOutBlock = -1; // indicating no block's output is held
for (i=0; i<N; ++i) {
    do {
        m_i = D_K(m_i);
    } while (c_{i-1} o m_i is not syntax compliant);
    if (m_i o x_{i+1}, ∀ compliant x_{i+1}, cannot be non-compliant) {
        if (lastHoldBlock >= 0) {
            for (j=i-1; j >= lastHoldBlock; --j) {
                if (m_j o m_{j+1} is not syntax compliant) {
                    do {
                        m_j = D_K(m_j) ;
                    } while (c_{j-1} o m_j o m_{j+1} is not syntax compliant);
                }
            }
        }
        lastHoldBlock = -1;
        Output blocks up to and including the current block
    } else { // hold output of the current block
        if (lastHoldBlock <0) {
            lastHoldBlock = i;
        }
    }
}
```

Locally Iterative Encryption with Block Ciphers

For the LIE engine 506 to use a block cipher 614, the length of each block 310 should be a multiple of the size of the encryption block used by the block cipher. The "physical" and "logical" blocks (e.g., 310 and 320 respectively) used in a locally iterative encryption schema should not be confused with encryption blocks that a block cipher operates on. "Encryption block" is used herein for the encryption blocks that a block cipher 614 operates on.

Typical sizes for an encryption block of a block cipher 614 are 64, 128, 192, or 256 bits, i.e., 8, 16, 24, or 32 bytes. A convenient choice for the length of each block in the locally iterative encryption schema is the encryption block size of the underlying block cipher 614. Other choices for the block length are also possible. Choice of block length in the LIE schema will be discussed in greater detail below.

A block cipher 614 can work in different modes. Frequently used modes are ECB, Cipher Block Chaining (CBC), Cipher-Feedback (CFB), and Output-Feedback (OFB). When a block cipher 614 works in ECB mode, the encryption and decryption schemata described above for stream ciphers 612 apply, except that the stream cipher encryption and decryption operations are replaced by those of a block cipher. When CFB or OFB mode is used, modular addition has to be used in place of the XOR operation of the conventional block cipher 614 working in one of these modes, just as in the stream cipher 612 case. The encryption and decryption schemata described above also apply to a block cipher 614 working in CFB or OFB mode. For OFB mode, it is more convenient to use the above-described forward decryption schema than the backward decryption schema since in the backward decryption schema the LIE engine 506 has to encrypt the shift register from the beginning to obtain the encryption output for the current block which is then modularly subtracted from the ciphertext of the current block 310 to recover the plaintext for the current block 310.

In one implementation, a block cipher in Cipher Block Chaining (CBC) mode is used to encrypt full blocks of a data stream of arbitrary length, and the same block cipher in Cipher-Feedback (CFB) mode is used to encrypt the last partial block, if applicable, with the shift register used in CFB mode (see page 200 of the book *Applied Cryptography: Protocols, Algorithms, and Source Code in C* by Bruce Schneier, 2nd ed., John Wiley & Sons, Inc. 1996) initialized with the ciphertext of last full block or an initialization vector if there is no full block. Thus, an LIE engine 506 with a block cipher 624 can encrypt plaintext of any length into ciphertext of exactly the same length.

For a block cipher 614 working in CBC mode, the operation of the LIE engine 506 can be summarized as follows, assuming the length of a block 310 is the same as the encryption block size of the block cipher 614. Otherwise, different choices of block size may result in minor modifications to the summary below:

```
C = M;   // copy plaintext to ciphertext
for (i=0; i<N; ++i) {
    do {
        c_i = E_k(c_i ⊕ c_{i-1});
    } while (C is not syntax compliant);
}
```

In the above description, "⊕" is the bitwise exclusive-or (i.e., XOR) operation, and $c_{-1}$ is defined as the initialization vector IV 636, or the encryption result of the initialization vector IV 636. In encrypting the current i-th block 310, the value of $c_{i-1}$ contains the ciphertext of the previous block 308. The corresponding backward and forward decryption schemata are summarized as follows:

Backward Decryption Schema:

```
M = C;   // copy ciphertext to plaintext
for (i=N-1; i>=0; --i) {
    do {
        m_i = c_{i-1} ⊕ D_K(m_i);
    } while (M is not syntax compliant);
}
```

Forward Decryption Schema:

```
M = C;   // copy ciphertext to plaintext
lastOutBlock = -1; // indicating no block's output is held
for (i=0; i<N; ++i) {
    do {
        m_i = c_{i-1} ⊕ D_K(m_i);
    } while (c_{i-1} ○ m_i is not syntax compliant);
    if (m_i ○ x_{i+1}, ∀ compliant x_{i+1}, cannot be non-compliant) {
        if (lastHoldBlock >= 0) {
            for (j=i-1; j >= lastHoldBlock; --j) {
                if ( m_j ○ m_{j+1} is not syntax compliant) {
                    do {
                        m_j = c_{j-1} ⊕ D_K(m_j);
                    } while (c_{j-1} ○ m_j ○ m_{j+1} is not syntax compliant);
                }
            }
        }
        lastHoldBlock = -1;
        Output blocks up to and including the current block
    } else { // hold output of the current block
        if (lastHoldBlock <0) {
            lastHoldBlock = i;
        }
    }
}
```

Again, in the above description of the forward decryption schema, it is assumed that the length each block 310 is long enough such that it is impossible for a substream from any consecutive three blocks to form an illegal symbol.

Choice of Block Size

There are several considerations when the data partitioner 604 determines the size of a block 310 in the locally iterative encryption schema. One consideration is complexity. As mentioned above, longer blocks generally result in a higher average number of iterations for encryption and decryption. Another consideration is error resilience. When errors occurs in the ciphertext 306, it is possible that an illegal substring appears or disappears during decryption, and then decryption stops at a wrong number of iteration cycles, resulting in an entire garbled block. Because of these considerations, the block size selector 610 chooses a block size as small as possible. However, the minimum block size is determined by the underlying cipher, and in the case of forward decryption, the maximum length of an illegal symbol.

For block ciphers 614, one implementation has each block 310 aligned with the encryption block of the cipher, which is typically 8, 16, 24, or 32 bytes. For a stream cipher 612, block sizes are usually aligned with the word size—typically 4 or 8 bytes long—of the computing device 504 used to perform the modular addition and subtraction so there is no need to carry and borrow bits. Smaller block sizes in this case would only slow down the processing speed since only a partial word would be utilized for each addition or subtraction operation.

When the block size selector 610 chooses one of the block sizes described above, the expected number of iterative encryption cycles for each block 310 is very close to just one. For conventional global iterative encryption under the syntax specification 108 for JPEG 2000 compressed data only an average of approximately 1.016 iterations if plaintext is of 8 bytes. This number of iterations is not the same as the expected number of iterations for encrypting a block 310 of 8 bytes in the LIE schema due to different boundary requirements, but the numbers would be very close. Fortunately, as shown in FIG. 4, the exemplary LIE schema results in a number of iterations per block that remains the same when the length of the data to be encrypted 102 increases, unlike conventional globally iterative encryption where the number of iterations increases exponentially with the total length of data to be encrypted 102. This is one of the greatest advantages of the LIE schema over conventional globally iterative encryption. Another major advantage is the error resilience.

Security

The security of the LIE schema depends on the cipher 624 that it uses. When a block cipher is used in CBC or ECB mode, the only difference between the LIE schema and conventional block cipher encryption is that a block may be encrypted multiple times in the LIE schema. The LIE schema has the same security level as a block cipher 614 working in the same mode.

For a stream cipher 612 or a block cipher 614 working in CFB or OFB mode, modular addition is used in place of the XOR operation which is equivalent to bitwise mod 2 addition. Both the XOR and the modular addition operations have the same strength of security: both depend on the security of the key stream. In the LIE schema, iterative modular addition is used: $c = m + r \cdot s \mod 2^n$, where s is the key stream and r is the number of iterations which depends on m and s of the current block, ciphertexts of previous blocks, plaintexts of next blocks, and syntax specifications 108. If $\gcd(r, 2^n) = 2^w$, then the last w bits in m do not change. Fortunately r is small, typically 1 in the LIE schema, the value of r depending on m and random s of the current block, ciphertexts of previous blocks, plaintexts of next blocks, and syntax specifications 108, so that the value of r is therefore unpredictable. It can be concluded that the LIE schema is also secure in this case.

Exemplary Method

Figure 9:
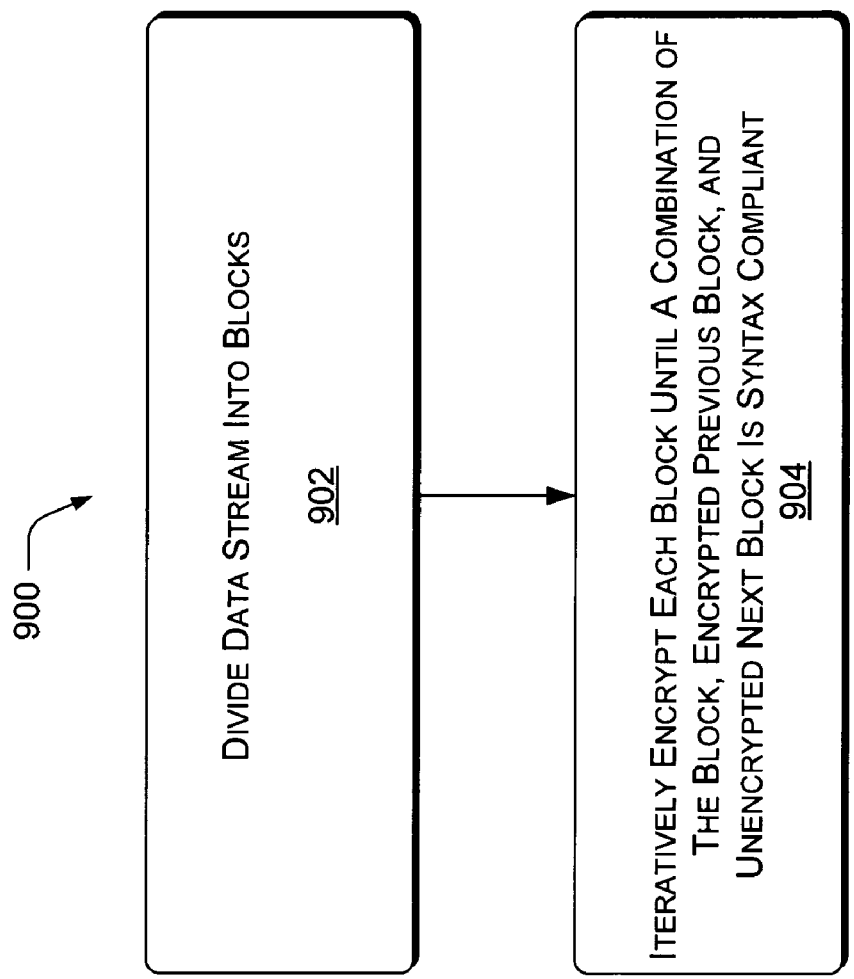
FIG. 9 is a flow diagram of an exemplary method of locally iterative encryption.

FIG. 9 shows an exemplary method 900 of performing exemplary locally iterative encryption. In the flow diagram, the operations are summarized in individual blocks. It should be noted that the exemplary method 900 may be performed by hardware, software, or combinations of both, for example, by components of an exemplary LIE engine 506.

At block 902, a data stream is divided into blocks. The blocks are typically of equal size, except perhaps ending blocks, which may be partial. The size of the blocks has an effect on the complexity of encryption and decryption so a data partitioner 604 of a LIE engine 506 may include a block size selector 610 that optimizes block size.

Besides the blocks of actual data to be iteratively encrypted and decrypted by the LIE schema, the data stream may also be divided into logical or theoretical blocks. The logical blocks are for associating a syntax compliance test with the iterative encryption and decryption of each actual block of data. For example, the number of cycles of encryption to apply to a given data block may be determined by when an associated logical block complies with a syntax specification for the data stream. In one case, the logical or theoretical block is the data combination consisting of the current block being encrypted or decrypted, the encrypted block previous to the current block, and the unencrypted block subsequent to the current block. This theoretical combination of data blocks in various stages of encryption and decryption allows byte sequences that span the boundaries of two adjacent blocks to be tested for syntax compliance.

At block 904, each data block is iteratively encrypted until a combination of the current block, the encrypted previous block, and the unencrypted next block is syntax compliant—that is, until a designated theoretical block that allows testing for forbidden byte sequences across block boundaries, is syntax compliant. When the syntax condition(s) are met, the LIE encryption process moves on to the next block in the stream sequence and to the corresponding logical block.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems, engines, methods, and schemata for locally iterative encryption that generates compliant ciphertext for general syntax specifications. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   dividing a stream of data into a sequence of data blocks, wherein a minimum of a block size for each data block is determined at least upon a maximum length of bits and sequences of bits forbidden by a syntax specification;
   partitioning the sequence of data blocks into a plurality of logical blocks, wherein each logical block comprises a data block to be encrypted, encrypted data of one or more previous data blocks immediately preceding the data block to be encrypted and unencrypted data of one or more next blocks immediately following the data block to be encrypted, and wherein the plurality of logical blocks overlap with each other; and
   iteratively encrypting the data block to be encrypted in each logical block in turn until, for each logical block, a first spanning sequence including stream data consisting of encrypted data of the block to be encrypted and the encrypted data of the one or more previous blocks immediately preceding the block to be encrypted, and a second spanning sequence including the encrypted data of the block to be encrypted and the unencrypted data of one or more next blocks immediately following the block to be encrypted are compliant with the syntax specification.

2. The method as recited in claim 1, wherein the iteratively encrypting includes encrypting with one of a stream cipher or a block cipher.

3. The method as recited in claim 2, wherein the iteratively encrypting uses one of a block cipher in electronic codebook (ECB) mode; a block cipher in cipher block chaining (CBC) mode; a block cipher in cipher feedback (CFB) mode; a block cipher in output feedback (OFB) mode; a block cipher in a mixture of modes selected from CBC, ECB, CFB, and OFB; a stream cipher; a stream cipher using modular additions and modular subtractions; an RC4 cipher; or a SEAL cipher.

4. The method as recited in claim 1, further comprising testing syntax compliance by comparing the first and second spanning sequences with one of a JPEG 2000 compressed data syntax specification or a general syntax specification.

5. The method as recited in claim 4, wherein the testing syntax compliance includes detecting the bits and the sequences of bits forbidden by the syntax specification within the first and second spanning sequences.

6. The method as recited in claim 1, further comprising appending filler data to complete partial end blocks and iteratively encrypting end blocks until the corresponding spanning sequences are compliant with the syntax specification.

7. The method as recited in claim 1, further comprising decrypting the encrypted stream beginning at the last block of the stream, including:
   iteratively decrypting the last block until the spanning sequence of the last block and the next-to-the-last block is compliant with the syntax specification, and
   iteratively decrypting each previous block until, for each block, the corresponding spanning sequences are compliant with the syntax specification.

8. The method as recited in claim 1, further comprising decrypting the encrypted stream beginning at the first block of the stream, including:
   iteratively decrypting the first block until the spanning sequence of the first block and of the one or more next blocks in the sequence of the stream are compliant with the syntax specification, wherein iteratively decrypting the second block intervenes with iteratively decrypting the first block in order to obtain the unencrypted data of the second block, and iteratively decrypting each subsequent block in the sequence of the stream, including iteratively decrypting a current block until the corresponding spanning sequences are compliant with the syntax specification, wherein iteratively decrypting the next block intervenes with iteratively decrypting the current block in order to obtain the unencrypted data of the next block.

9. The method as recited in claim 8, further comprising iteratively decrypting the current block, wherein iteratively decrypting multiple subsequent blocks intervenes with iteratively decrypting the current block in order to obtain the unencrypted data of the next block.

10. A storage medium comprising a plurality of executable instructions which, when executed, implement a method according to claim 1.

11. An engine comprising:
a data partitioner to divide a data stream into a plurality of data blocks, wherein a minimum of a block size for each data block is determined at least upon a maximum length of reserved values and reserved sequences in a syntax specification;
an iterator to apply one or more encryption cycles to each data block of a data stream, wherein data at adjacent ends of two data blocks forms a spanning sequence; and
a syntax tester to determine for each of the data blocks a number of the encryption cycles to apply, wherein for a current block being encrypted, the number is based on the spanning sequences of a logical block being compliant with the syntax specification, wherein the logical block consists of the current block, one or more encrypted adjacent previous blocks, and one or more unencrypted adjacent next blocks and wherein one of the spanning sequences includes encrypted data from the current block and unencrypted data of an adjacent next block.

12. The engine as recited in claim 11, further comprising a cipher selector to designate a cipher to be used for encrypting an decrypting the data stream, wherein the cipher selector designates one of a block cipher in electronic codebook (ECB) mode; a block cipher in cipher block chaining (CBC) mode; a block cipher in cipher feedback (CFB) mode; a block cipher in output feedback (OFB) mode; a block cipher in a mixture of modes selected from CBC, ECB, CFB, and OFB; a stream cipher; a stream cipher using modular additions and modular subtractions; an RC4 cipher; or a SEAL cipher.

13. The engine as recited in claim 11, further comprising a buffer to hold blocks of the data stream, including unencrypted blocks, encrypted blocks, and blocks currently being encrypted or decrypted.

14. The engine as recited in claim 11, further comprising an overlap engine to append data of encrypted and unencrypted adjacent blocks with each other and a byte reader to read bytes and to read sequences of bytes across the appended data.

15. The engine as recited in claim 14, further comprising a comparator to compare the bytes or bits and to compare the sequences of bytes or bits with the reserved values and the reserved sequences of the syntax specification during a syntax test.

16. The engine as recited in claim 11, wherein:
the iterator applies one or more decryption cycles to each block of the stream beginning at the last block of the stream, wherein the iterator applies decryption cycles to the last block until the spanning sequence of the last block and the one or more next-to-the-last blocks are compliant with the syntax specification; and the iterator applies one or more decryption cycles to each previous block of the stream until the corresponding spanning sequences are compliant with the syntax specification.

17. The engine as recited in claim 11, wherein:
the iterator applies one or more decryption cycles to each block of the stream beginning at the first block of the stream, wherein the iterator applies decryption cycles to the first block until the spanning sequence of the first block and the one or more next blocks in the sequence of the stream is compliant with the syntax specification, wherein iteratively decrypting the second block intervenes with iteratively decrypting the first block in order to obtain the unencrypted data of the second block, and
the iterator applies one or more decryption cycles to each subsequent block in the sequence of the stream, wherein the iterator applies decryption cycles to a current block until the corresponding spanning sequences are compliant with the syntax specification, wherein iteratively decrypting one or more next blocks intervenes with iteratively decrypting the current block in order to obtain the unencrypted data of the next block.

18. A method comprising:
receiving a stream of encrypted data blocks;
applying one or more decryption cycles to a first encrypted data block of the stream until a first spanning sequence is compliant with a syntax specification or data of the first data block at an end adjacent to the second data block immediately following the first block in the stream does not comprise a first portion of any reserved marker in the syntax specification, the first spanning sequence including stream data consisting of the first data block and a second data block immediately following the first data block in the stream;
iteratively applying one or more decryption cycles to each encrypted data block following the first encrypted data block in the stream, the iteratively applying including:
determining whether a second spanning sequence is compliant with the syntax specification, the second spanning sequence including stream data consisting of a current data block and encrypted data of a data block immediately preceding the current data block in the stream and data of the current data block at an end adjacent to a data block immediately following the current data block in the stream comprises a first portion of any reserved marker in the syntax specification;
in an event that the second spanning sequence is not compliant with the syntax specification, applying one more decryption cycle to the current data block and repeating the iteratively applying;
in an event that the second spanning sequence is compliant with the syntax specification and the data of the current data block at the end adjacent to the data block immediately following the current data block in the stream does not comprise a first portion of any reserved marker in the syntax specification, outputting the current block;
in an event that the second spanning sequence is compliant with the syntax specification but the data of the current data block at the end adjacent to the data block immediately following the current data block in the stream comprises a first portion of any reserved marker in the syntax specification, waiting until the data block immediately following the current block in the stream is decrypted before determining whether the current block is outputted or one more decryption cycle is applied to the current block and the iteratively applying is repeated.

19. The method as recited in claim 18, wherein prior to the receiving, the method further comprises forming the stream of encrypted data blocks by acts comprising:

dividing a stream of unencrypted data into a sequence of unencrypted data blocks; and iteratively encrypting each of the unencrypted data blocks of the sequence in turn until, for each data block to be encrypted, a third spanning sequence and a fourth spanning sequence are compliant with a syntax specification, the third spanning sequence including stream data consisting of encrypted data of the each data block to be encrypted and encrypted data of one or more previous blocks immediately preceding the each data block to be encrypted and the fourth spanning sequence including the encrypted data of the each data block to be encrypted and unencrypted data of one or more next blocks immediately following the each data block to be encrypted.

* * * * *

UNITED STATES PATENT AND TRADEMARK OFFICE
CERTIFICATE OF CORRECTION

| | | |
|---|---|---|
| PATENT NO. | : 7,769,168 B2 | Page 1 of 1 |
| APPLICATION NO. | : 11/095048 | |
| DATED | : August 3, 2010 | |
| INVENTOR(S) | : Bin Benjamin Zhu et al. | |

It is certified that error appears in the above-identified patent and that said Letters Patent is hereby corrected as shown below:

On the Title Page (54), change "Interative" to --Iterative--.

On column 1, line 1, change "Interative" to --Iterative--.

Signed and Sealed this

Twenty-first Day of December, 2010

David J. Kappos
*Director of the United States Patent and Trademark Office*